Patented June 25, 1929.

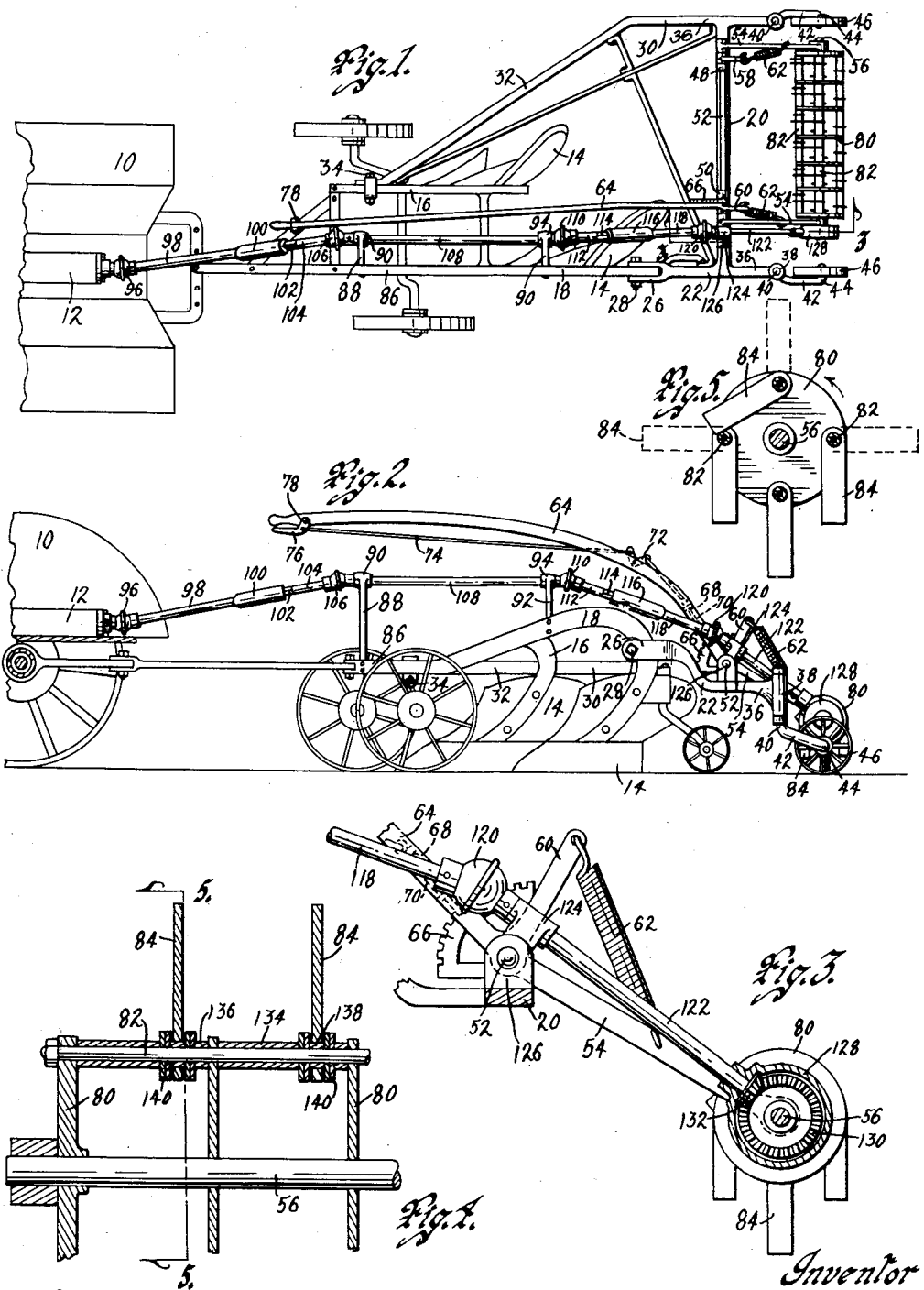

1,718,564

UNITED STATES PATENT OFFICE.

ALFRED A. KIETZKE, OF BONDURANT, IOWA.

POWER TAKE-OFF PULVERIZER.

Application filed August 1, 1927. Serial No. 209,783.

The object of my invention is to provide a power take-off pulverizer of very simple, durable and inexpensive construction.

More particularly, it is my purpose to provide such a device, which can be conveniently connected with other agricultural implements, such for instance as a plow drawn by a tractor.

Another purpose is to provide a power take-off connection of novel structure for such a pulverizer.

Another purpose is to provide such a pulverizer, which when so mounted and associated with another implement, such as a plow, will effectively crush and reduce the clods behind the plow with a minimum power requirement by striking the clods with pivoted striking arms.

With these and other objects in view, my invention consists in the construction, arrangement and combination of the various parts of my power take-off pulverizer, whereby the objects contemplated are attained, as hereinafter more fully set forth, pointed out in my claims, and illustrated in the accompanying drawings, in which:

Figure 1 is a top or plan view of my device associated with a tractor and plow.

Figure 2 is a side elevation of the same, the rear end of the tractor being shown in vertical section.

Figure 3 is a detail, sectional view taken on the line 3—3 of Figure 1.

Figure 4 is a detail, longitudinal, sectional view through one end of the pulverizer; and Figure 5 is a sectional view taken on the line 5—5 of Figure 4.

In the accompanying drawings, I have used the reference numeral 10 to indicate generally a tractor of the type used for farming operations, which tractor is provided with the power take-off shaft structure 12.

I have shown the tractor 10 associated with a two-bottom plow 14 having the beams 16 and 18. I have not assumed to describe the plow, which may be of any suitable construction.

My improved power take-off pulverizer has a frame, comprising a cross member 20 arranged behind the plow and provided at one end with the forwardly extending arm 22, having the bifurcated end 26 pivoted to the beam 18 as by the bolt 28.

At the other end, the frame member 20 has a forwardly extending member 30 at the forward end of which is a portion or member 32 inclined forwardly and toward the beam member 16 to which the frame member 32 is secured by means of a bolt 34, which will permit tilting movement of the frame member 32.

Extending rearwardly from the frame member 20 are the laterally spaced frame members 36, which have at their rear ends the vertical sleeves or journals 38 for the upright stems 40, which have at their lower ends downwardly and rearwardly inclined portions 42 terminating in horizontal spindles 44 for the castor wheels 46.

Thus the frame of the pulverizer is pivotally supported at its forward part and supported by the castor wheels at its rearward part.

On the frame member 20 are upwardly extending bearing members 48 and 50. Journaled in these bearing members is the transverse shaft 52. Pivotally supported on the shaft are laterally spaced, rearwardly extending arms 54. Journaled in the rear ends of the arms 54 is the pulverizer shaft 56.

On the shaft 52 is fixed an upwardly and rearwardly inclined arm 58 and a similar spaced arm 60. Springs 62 are connected with the arms 58 and 60 and the arms 54.

Formed preferably integrally with the arm 60 is a long lever 64 extending forwardly as shown in Figures 1 and 2.

Fixed to the bearing member 50 is a notched sector 66.

The lever 64 is curved as shown in Figure 2. It has slidably mounted on it as at 68 a pawl 70 for coacting with the toothed notched sector 66. One end of the pawl is pivoted to a bell crank lever 72, which is in turn pivoted on the lever 64. Pivoted to the lever 72 is a link 74, which is pivoted to a handle 76 near the forward end of the lever. The handle 76 is pivoted as at 78 to the lever 64.

The pawl is provided with the usual spring means not here shown in detail for normally holding it in engagement with the toothed sector 66.

It will thus be seen that by manipulating the lever 64, the arms 58 and 60 may be raised or lowered, so that the springs 62 will yieldingly support the arms 54 and the shaft 56 at the desired height.

On the shaft 56, I fix a series of spaced discs 80. A plurality of rods 82 are connected with the respective discs 80 and are arranged in spaced parallel relation as shown in Figure 5.

Pivoted to the respective rods 82 are beater or striker arms 84, which are staggered with relation to each other between the respective discs 80.

Thus when the shaft 56 is rotated, it carries with it the discs 80 and rods 82 and causes the beater arms 84 to swing and strike and break up the clods behind the plow.

For operating the shaft 56, I have provided the following means:

I mount on the frame 86 of the plow 14 a bracket 88, having at its upper end the bearing 90.

Mounted on the beam 18 is a bracket 92 having at its upper end a bearing 94 aligned with the bearing 90.

Connected with the power take-off shaft structure 12 of the tractor by means of a universal joint 96 is a shaft 98 extending rearwardly and having at its rear end a socket 100 with an angular hole to receive the end 102 of the shaft 104. The end 102 is angular in cross section.

The shaft 104 is connected by a universal joint 106 with the shaft 108 journaled in the bearings 90 and 94. The shaft 108 is connected by a universal joint 110 with the shaft 112, which has the squared end 114. This squared end 114 is received in a socket 116 having a hole angular in cross section. The socket 116 forms part of a shaft 118. The shaft 118 is connected by means of a universal joint 120 with a shaft 122. The shaft 122 is journaled in a bearing 124 pivoted on a third bearing 126 for the shaft 52. The bearing 126 is fixed on the frame member 20. The rear end of the shaft 122 projects into a casing 128 on the shaft 56.

On the shaft 56 in the casing 128 is a beveled gear 130, which meshes with a beveled pinion 132 on the shaft 122.

Thus when the shaft of the power take-off shaft structure 12 is rotated, rotation will be imparted to the shaft 56 for operating the pulverizer.

In the practical assembling of my power take-off pulverizer, the brackets 88 and 92 are fastened in place and the frame members 22 and 32 are connected with the beams 18 and 16 by means of the bolts 28 and 34.

The pulverizer shaft structure for connecting the power take-off shaft structure 12 of the tractor with the axle or shaft 56 is then assembled in the manner shown in the drawings. The pulverizer is drawn behind the plow.

When it is desired to use the pulverizer, the lever 64 is manipulated to lower the arms 54 and thus lower the pulverizer proper to the desired position above the ground.

Then the pulverizer shaft structure can be actuated from the tractor for rotating the shaft 56 and discs 80 and actuating the beater arms 84.

In Figure 4, I have shown a somewhat more detailed structure of the pulverizer proper.

While I do not desire to limit myself to the details of this structure, it will be seen that I have shown on the shafts 80 the spaced sleeves 134 and 136 for holding the beater arms 84 properly spaced. The beater arms 84 may be mounted on bushings 138 between washers 140.

Changes may be made in the details of the construction and arrangement of the parts of my improved power take-off pulverizer, and it is my intention to cover by my claims any modified forms of structure or use of mechanical equivalents, which may be reasonably included within their scope.

I claim as my invention:

1. In a power take-off pulverizer, a frame adapted to be pivotally connected with a support and having at one end castor wheels, a transverse shaft rotatably supported on said frame, arms fixed to said shaft, arms pivoted to said shaft, a pulverizer shaft supported by said last-described arms, springs interposed between said first arms and said pivoted arms, for yieldingly supporting the pulverizer shaft, means for adjusting said shaft to different fixed positions, and pulverizing means carried by said pulverizer shaft.

2. In a power take-off pulverizer, a frame adapted to be pivotally connected with a support and having at one end castor wheels, a transverse shaft rotatably supported on said frame, arms fixed to said shaft, arms pivoted to said shaft, a pulverizer shaft supported by said last-described arms, springs interposed between said first arms and said pivoted arms, for yieldingly supporting the pulverizer shaft, means for adjusting said shaft to different fixed positions, pulverizing means carried by said pulverizer shaft, and means for rotating said pulverizer shaft.

Des Moines, Iowa, July 21, 1927.

ALFRED A. KIETZKE.